United States Patent [19]

Dennis et al.

[11] 4,020,538
[45] May 3, 1977

[54] TURBOMACHINERY BLADE TIP CAP CONFIGURATION

[75] Inventors: Ronald E. Dennis, Cincinnati; William D. Treece, Forest Park; Robert J. Corsmeier, Cincinnati, all of Ohio

[73] Assignee: General Electric Company, Cincinnati, Ohio

[22] Filed: Dec. 9, 1974

[21] Appl. No.: 530,720

Related U.S. Application Data

[62] Division of Ser. No. 355,150, April 27, 1973, Pat. No. 3,899,267.

[52] U.S. Cl. ............................. 29/156.8 H; 29/510; 29/516

[51] Int. Cl.² ......................................... B23P 15/04

[58] Field of Search ............... 29/156.8 H, 156.8 B, 29/509, 510, 516; 416/96, 97, 92, 95, 232; 285/382; 403/274

[56] References Cited

UNITED STATES PATENTS

| | | | |
|---|---|---|---|
| 244,804 | 7/1881 | Gillespie | 285/382 |
| 402,627 | 5/1889 | Smith | 29/516 |
| 1,269,541 | 6/1918 | Ljungstrom | 416/216 |
| 1,609,171 | 11/1926 | Hughes | 285/382 |
| 1,669,236 | 5/1928 | Fick | 29/509 |
| 2,574,625 | 11/1951 | Coss | 285/382 |
| 2,662,382 | 12/1953 | Potchen | 29/510 |
| 2,891,525 | 6/1959 | Moore | 29/516 |
| 3,420,502 | 1/1969 | Howald | 415/115 |
| 3,628,880 | 12/1971 | Smuland et al. | 416/96 |
| 3,628,885 | 12/1971 | Sidenstick et al. | 416/97 |
| 3,635,587 | 1/1972 | Giesman | 29/156.8 H |
| 3,723,949 | 3/1973 | Wallo | 29/510 |
| 3,732,031 | 5/1973 | Bowling et al. | 29/156.8 H |

*Primary Examiner*—C.W. Lanham
*Assistant Examiner*—Daniel C. Crane
*Attorney, Agent, or Firm*—Dana F. Bigelow; Derek P. Lawrence

[57] ABSTRACT

An improved tip cap configuration for a turbomachinery blade includes tip cap seats formed integrally with and located on the inner sides of a hollow turbomachinery blade. Tip cap retaining members are also formed integrally with the inner wall of the blade and are spaced a short radial distance from the tip cap seats. The blade is initially provided with a flared open end and the tip caps are positioned on the seats and the flared end is crimped so as to capture the tip cap between the seats and the retaining members. The crimping operation is stopped at a point wherein a smooth outer contour is obtained for the blade in the region of the tip cap. A method of making such a blade is also disclosed.

3 Claims, 6 Drawing Figures

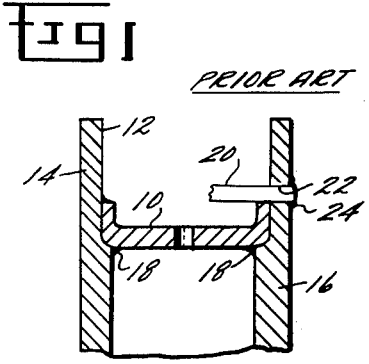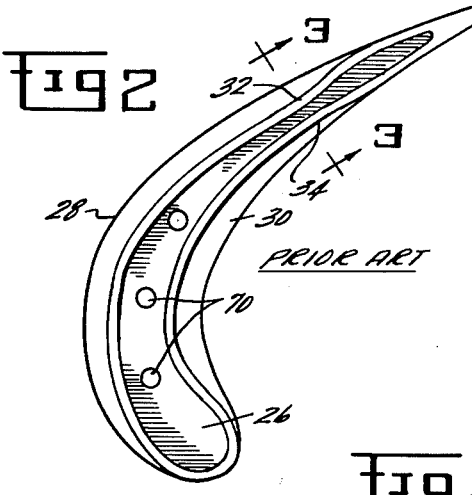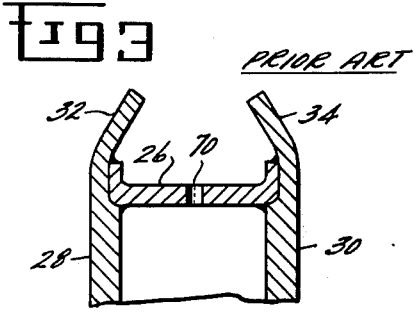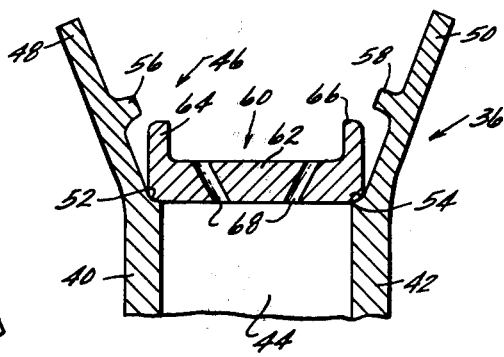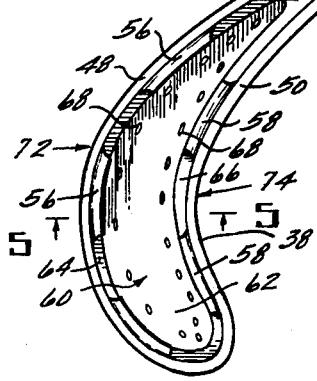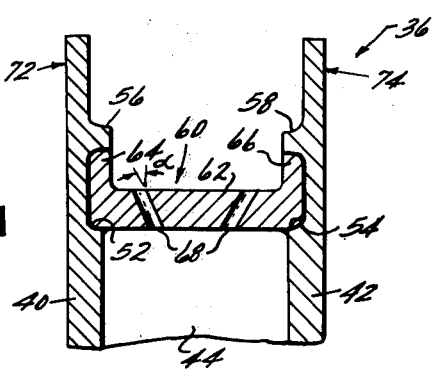

TURBOMACHINERY BLADE TIP CAP CONFIGURATION

The invention herein described was made in the course of or under a contract, or a subcontract thereunder, with the United States Department of the Air Force.

This is a division of application Ser. No. 355,150 filed Apr. 27, 1973, now U.S. Pat. No. 3,899,267, issued Aug. 2, 1975.

BACKGROUND OF THE INVENTION

This invention relates primarily to turbomachinery blading and, more particularly, to an improved tip cap configuration for a hollow turbomachinery blade and a method of making such a configuration.

It is well known that significant increases in gas turbine engine performance, in terms of thrust or work output per unit of fluid input, can be obtained by increasing the turbine inlet temperature of the motive fluid or hot gas stream flowing through the engine. It is also recognized that one major limitation on turbine inlet temperature is that which is imposed by the turbine blade temperature capability. In an effort to extend turbine blade capabilities, numerous complex turbomachinery blade structures have been proposed which employ one or more modes of cooling using fluid extracted from the gas turbine engine compressor.

One such mode of cooling which is becoming prevalent is the provision of impingement inserts within an internal cavity defined by a hollow body portion of the turbomachinery blade. Coolant is delivered to the interior of such an insert and is expelled through a multiplicity of small holes against an internal wall of the turbomachinery blade, thereby cooling that portion of the turbomachinery blade which is exposed to the hot gas stream.

In order to permit insertion of the impingement inserts into the interior of the turbomachinery blade, many such blades are provided with open tip ends. As is known to those skilled in the art, in order to maximize turbine efficiency, it becomes necessary to minimize the amount of cooling air which is expended in cooling each component. For this reason, it has become necessary to seal the tip ends of the blades in order to prevent cooling fluid from being wastefully discharged into the gas stream. In many prior art designs, the open tip end of the blade is sealed by means of a tip cap which is joined to the blade in a suitable manner. While a number of alternative methods have been proposed in the past for joining the tip cap to the blade, none of these methods has proven universally acceptable for numerous reasons. When one considers that these tip caps must operate in an environment where they are subjected to centrifugal forces on the order of 100,000 times the normal gravitational force and metal temperatures in excess of 1500° F, it becomes easy to envision why no single method of joining the tip cap to the blade has proven universally acceptable.

When one futher considers the fact that the tip cap is inserted in an airfoil-shaped blade and that any distortion in the shape of the airfoil at its tip end can greatly reduce the aerodynamic efficiency of the blade, the problems of joining the tip cap to the blade increase. The problems are even further complicated when cooling requirements for that portion of the blade tip which extends above the tip cap are considered.

SUMMARY OF THE INVENTION

It is an object of this invention, therefore, to provide a turbomachinery blade tip cap configuration which overcomes the problems of the prior art configurations. It is a further object of this invention to provide such a tip cap configuration which is mechanically secured by the balde member and which provides an airfoil-shaped tip which is free from distortion and which is capable of being cooled by coolant from the interior of the blade. Another object of this invention is to provide a new method for making a turbomachinery blade which includes the inventive tip cap configuration.

Briefly stated, the above and similarly related objects are attained in the present instance by providing a hollow turbomachinery blade which is initially formed with a flared, open tip end. The flared, open end is provided with tip cap seats which are formed integrally with and located along the inner walls of the hollow blade member. Tip cap retainers are also formed integrally with the inner walls of the hollow blade member and are spaced a short distance from the tip cap seat. The tip cap, which may have a generally U-shaped cross section, is inserted into the flared, open end and is positioned upon the tip cap seats. The flared end is then crimped into a nondistorted airfoil-shaped member such that the tip cap retainers are positioned above the tip cap, thereby capturing the tip cap between the seats and the retainers. Coolant holes are positioned around the perimeter of the tip cap and are angled so as to impinge coolant against the inner sides of the tip portion of the airfoil-shaped member.

DETAILED DESCRIPTION OF THE DRAWING

While the specification concludes with a series of claims which distinctly claim and particularly point out the subject matter which Applicants believe to be their invention, a complete understanding of the invention will be gained from the following detailed description, which is given in connection with the accompanying drawing, in which:

FIG. 1 is an axial, cross-sectional view of a prior art tip cap configuration;

FIG. 2 is a top plan view of another prior art tip cap configuration;

FIG. 3 is a sectional view, taken along line 3—3 of FIG. 2;

FIG. 4 is a partial sectional view of the inventive tip cap configuration showing an initial step of manufacture;

FIG. 5 is a partial cross-sectional view, similar to FIG. 4, taken generally along line 5—5 of FIG. 6 and showing the completed tip cap configuration; and FIG. 6 is a top plan view of the inventive tip cap configuration.

DESCRIPTION OF A PREFERRED EMBODIMENT

Referring to the drawings wherein like numerals correspond to like elements throughout, attention is directed initially to FIGS. 1 through 3 wherein prior art attempts at tip cap retention are shown. For example, one initial attempt at retaining a tip cap 10 in the open end 12 of the airfoil-shaped blade consisted simply of brazing the tip cap end directly to the side walls 14 and 16 of the airfoil-shaped blade. In such a case, a suitable braze alloy 18 was placed at the joint between the tip cap 10 and the side walls 14 and 16, and the assembly was heated in an appropriate furnace. This type of configuration normally was adequately sealed but had poor mechanical integrity due to the inconsistency of the braze joint.

In order to improve the reliability of this design, separate retention members, such as a pin 20, were occasionally inserted through holes 22 positioned in the side walls 14 and 16 of the blade. The pins 20 were then brazed to the side walls 14 and 16 with a suitable braze alloy 24. This configuration improved the mechanical integrity of the joint and kept the tip cap 10 in place, but the configuration disrupted the external airfoil shape due to the projecting portion of the pins 20 and the braze alloy 24 located on the outer side of the side walls 14 and 16. The pins 20 also increased the tip stress and added weight and complexity to the design.

A further attempt at retaining the tip caps without adding complexity to the blade is shown in FIGS. 2 and 3 wherein a tip cap 26 is positioned between a pair of side walls 28 and 30, and tip portions 32 and 34 of the side walls 28 and 30, respectively, are crimped toward one another at certain locations along the airfoil as shown in FIGS. 2 and 3. By crimping the portions 32 and 34, the tip cap 26 was secured to the airfoil blade. The design shown in FIGS. 2 and 3, however, distorts the desired airfoil shape at the blade tip thereby potentially reducing the overall efficiency of such a blade.

Referring now to FIGS. 4 through 6, a turbomachinery blade constructed in accordance with the present invention is designated by the general numeral 36. The blade 36 is provided with a hollow airfoil section 38 which includes a pair of side walls 40 and 42 which define an internal cavity 44.

As best shown in FIG. 4, the turbomachinery blade 36 is formed initially with a flared, open end 46, which is provided by angled tip ends 48 and 50 of the side walls 40 and 42. At the approximate location where the angled tip ends 48 and 50 begin, the side walls 40 and 42 are indented so as to provide tip cap seats 52 and 54, respectively. At a short radial distance above each of the tip cap seats 52 and 54, the side walls 40 and 42 are provided with tip cap retaining members, which in the present case take the form of a plurality of rabbets 56 and 58 formed integrally with the angled tip ends 48 and 50 of the side walls 40 and 42.

As further shown in FIG. 4, the flared open end 46 of the turbomachinery blade is flared to a sufficient width such that a tip cap 60 may be inserted through the opening formed between the rabbets 56 and 58 and positioned on the tip cap seats 52 and 54. The tip cap 60 may take the form of a casting or of a coined piece and, as shown in FIGS. 4 and 5, may be provided with a genrally U-shaped cross section having a bight portion 62 and a pair of upstanding leg members 64 and 66. As shown in FIG. 6, the tip cap 60 provides a generally airfoil-shaped flat plate capable of sealing the entire opening formed between side walls 40 and 42 of the turbomachinery blade 36.

The tip cap 60 is provided with a plurality of coolant holes 68, which extend through the bight portion 62 thereof. Each of the holes 68 is drilled or cast at an angle α (FIG. 5) with respect to the vertical so as to direct coolant fluid against the inner sides of the side walls 40 and 42 near the region of the rabbets 56 and 58. Furthermore, as shown in FIG. 6, the holes 68 are spaced around the entire perimeter of the tip cap 60.

The angled holes and the spacing around the entire perimeter of the tip cap provide two basic features, namely improved tip region cooling and improved aerodynamic sealing at the blade tip. With a plurality of smaller holes uniformly spaced around the perimeter of the tip cap, the hot gas stream air is further precluded from leaking over the blade tip into the cavity formed above the tip cap 60 even more than was true in the case of a smaller number of large holes 70 provided in the tip cap shown in FIG. 2.

Once the tip cap 60 is positioned on the tip cap seats 52 and 54, as shown in FIG. 4, the angled ends 48 and 50 of the side walls 40 and 42 are formed, such as by crimping, to the configuration shown in FIGS. 5 and 6, wherein the tip cap 60 is captured between the seats 52 and 54 and the rabbets 56 and 58. As further shown, when the crimping operation is complete, the side walls 40 and 42 are provided with smooth outer contours 72 and 74 which, in turn, provide a desired airfoil configuration along the entire radial height of the blade. In other words, no disruptions in the external airfoil shape are caused near the tip of the blade, while the tip cap 60 is mechanically secured thereto. As seen in FIG. 5, the smooth outer contour results in a straight radial line for the outer contour when a section is taken through the blade tip at any point between the leading and trailing edge of the blade.

In some applications, it may be desirable to provide a better fluidic seal for the tip cap 60. In such a case, a suitable braze alloy may be positioned around the perimeter of the tip cap 60 before or after it is placed on the tip cap seats 52 and 54, as shown in FIG. 4. Once the side walls 40 and 42 are formed as shown in FIGS. 5 and 6, the blade can thereafter be placed in a furnace in which the braze alloy is heated to form a seal and to further retain the tip cap 60 in place. As best shown in FIGS. 4 and 5, the upstanding leg portions 64 and 66 of the tip cap 60 are sized so as to fit between the tip cap seats 52 and 54 and the retaining members or rabbets 56 and 58. In this manner, the tip cap 60 is both mechanically secured and, if necessary, brazed to the turbomachinery blade in a desired location.

While Applicants have described a preferred embodiment of an inventive tip cap configuration and have further described a novel method for making a turbomachinery blade using a separate tip cap configuration, it should be clear to those skilled in the art that changes could be made in the embodiment described herein without departing from the broad aspects of Applicants' invention. It is intended, therefore, that the appended claims cover all such modifications which fall within the broad aspects of Applicants' invention.

We claim:

1. In a method of making a hollow turbomachinery blade, the steps of: providing an airfoil-shaped blade with a flared open tip end; providing said airfoil-shaped blade with a tip cap seat formed integrally with an inner wall of said flared open tip end and at least one tip cap retaining member spaced from said tip cap seat outer end of the blade; placing a tip cap within said flared open end; and crimping said flared open end to retain said tip cap with said tip cap retaining member while providing a smooth, continuous airfoil contour from a point below the tip cap to the outer end of the blade.

2. The method of claim 1 wherein said blade is a cast member.

3. The method of claim 1 further including the step of brazing said tip cap to said blade.

* * * * *

UNITED STATES PATENT AND TRADEMARK OFFICE
CERTIFICATE OF CORRECTION

PATENT NO. : 4,020,538
DATED : May 3, 1977
INVENTOR(S) : Ronald E. Dennis et al

It is certified that error appears in the above-identified patent and that said Letters Patent are hereby corrected as shown below:

Column 4, line 59, claim 1, after "tip cap seat", insert --and spaced inwardly from an--.

Signed and Sealed this

Sixth Day of September 1977

[SEAL]

Attest:

RUTH C. MASON
Attesting Officer

LUTRELLE F. PARKER
Acting Commissioner of Patents and Trademarks